US010621702B1

(12) United States Patent
Robison (10) Patent No.: US 10,621,702 B1
(45) Date of Patent: Apr. 14, 2020

(54) EDGE REJECTING SCENE BASED NON-UNIFORMITY CORRECTION FOR UNCOOLED INFRARED

(71) Applicant: BAE SYSTEMS Information and Electronic Systems Integration Inc., Nashua, NH (US)

(72) Inventor: Derek T Robison, Acton, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/359,584

(22) Filed: Mar. 20, 2019

(51) Int. Cl.
*H04N 5/33* (2006.01)
*G06T 5/00* (2006.01)
*G06T 5/50* (2006.01)
*G06T 5/20* (2006.01)

(52) U.S. Cl.
CPC ............... *G06T 5/002* (2013.01); *G06T 5/20* (2013.01); *G06T 5/50* (2013.01); *H04N 5/33* (2013.01); *G06T 2207/10048* (2013.01); *G06T 2207/20032* (2013.01); *G06T 2207/20192* (2013.01); *G06T 2207/20224* (2013.01)

(58) Field of Classification Search
CPC .. H04N 5/33; G06T 5/002; G06T 5/20; G06T 5/50; G06T 2207/10048; G06T 2207/20037; G06T 2207/20192; G06T 2207/20224
USPC .......................................................... 348/164
See application file for complete search history.

(56) References Cited

U.S. PATENT DOCUMENTS

| 5,471,240 | A | * | 11/1995 | Prager | H04N 5/33 250/332 |
| 5,614,715 | A | * | 3/1997 | Jones | H04N 3/09 250/332 |
| 7,880,777 | B2 | * | 2/2011 | Anderson | H04N 5/33 348/164 |
| 2012/0091340 | A1 | * | 4/2012 | Young | H04N 5/33 250/332 |
| 2014/0016879 | A1 | * | 1/2014 | Hogasten | G06T 5/002 382/264 |
| 2016/0086315 | A1 | * | 3/2016 | Bailey | G06T 5/005 348/164 |
| 2017/0372453 | A1 | * | 12/2017 | Foster | G06T 7/246 |
| 2018/0276803 | A1 | * | 9/2018 | Lee | G06T 5/009 |

\* cited by examiner

*Primary Examiner* — Michael Lee
(74) *Attorney, Agent, or Firm* — Maine Cernota & Rardin

(57) ABSTRACT

A system reducing pixel-based spatial noise for an uncooled infrared imager includes a first step of subtracting the historical scene-based NUC offsets for each selected pixel calculated from the previous frame. A filtered image for output module output is calculated using an edge preserving smoothing filter. The edge preserving smoothing function consists of a plus-shaped median kernel in which selected pixels that differ from the center pixel by greater than a specified threshold are replaced with the center pixel. The result is subtracted from the center pixel forming a high pass, edge ignoring, version of the frame which is dominated by system noise. A low pass version of the noise frame is created with a 5×5 mean filter. This is subtracted from the initial noise frame to improve scene rejection. This high pass version of the image/noise frame is attenuated by a configurable value.

20 Claims, 8 Drawing Sheets

HIGH LEVEL FLOW CHART

IRFPA NON-UNIFORMITY EXAMPLE
FIG. 1

HIGH LEVEL FLOW CHART
FIG. 2

DETAIL FLOW CHART
210 OBTAINING AN EDGE-PRESERVED, NOISE-SMOOTHED, IMAGE FRAME
FIG. 3

215 OBTAINING AN EDGE-IGNORING, HIGH-PASS, IMAGE FRAME

DETAIL FLOW CHART

FIG. 4

DETAIL FLOW CHART
FIG. 5

FLOW CHART SECOND EMBODIMENT
FIG. 6

PLUS-SHAPED MEDIAN KERNEL
FIG. 7

UNPROCESSED "BEFORE" IMAGE

PROCESSED "AFTER" IMAGE
BEFORE AND AFTER
FIG. 8

EDGE REJECTING SCENE BASED NON-UNIFORMITY CORRECTION FOR UNCOOLED INFRARED

STATEMENT OF GOVERNMENT INTEREST

This invention was made with government support under Contract No. W91CRB-16-D-0030/0001 awarded by the U.S. Army. The United States Government has certain rights in the inventions.

FIELD OF THE DISCLOSURE

This disclosure relates to noise in uncooled infrared imagers, more particularly, reducing pixel based spatial noise in uncooled infrared imagers through a scene-based correction, significantly reducing or eliminating burn-in of edges in resource-constrained, small form factor, lightweight, environments.

BACKGROUND

Reducing pixel-based spatial noise in uncooled infrared imagers without burn-in is a difficult problem, especially when large amounts of resources are not available, as in small form factor, lightweight, environments. Existing solutions are either not effective in situations with little or no movement, or create burn-in during such situations. Many of these solutions require large amounts of resources.

Figure 1:
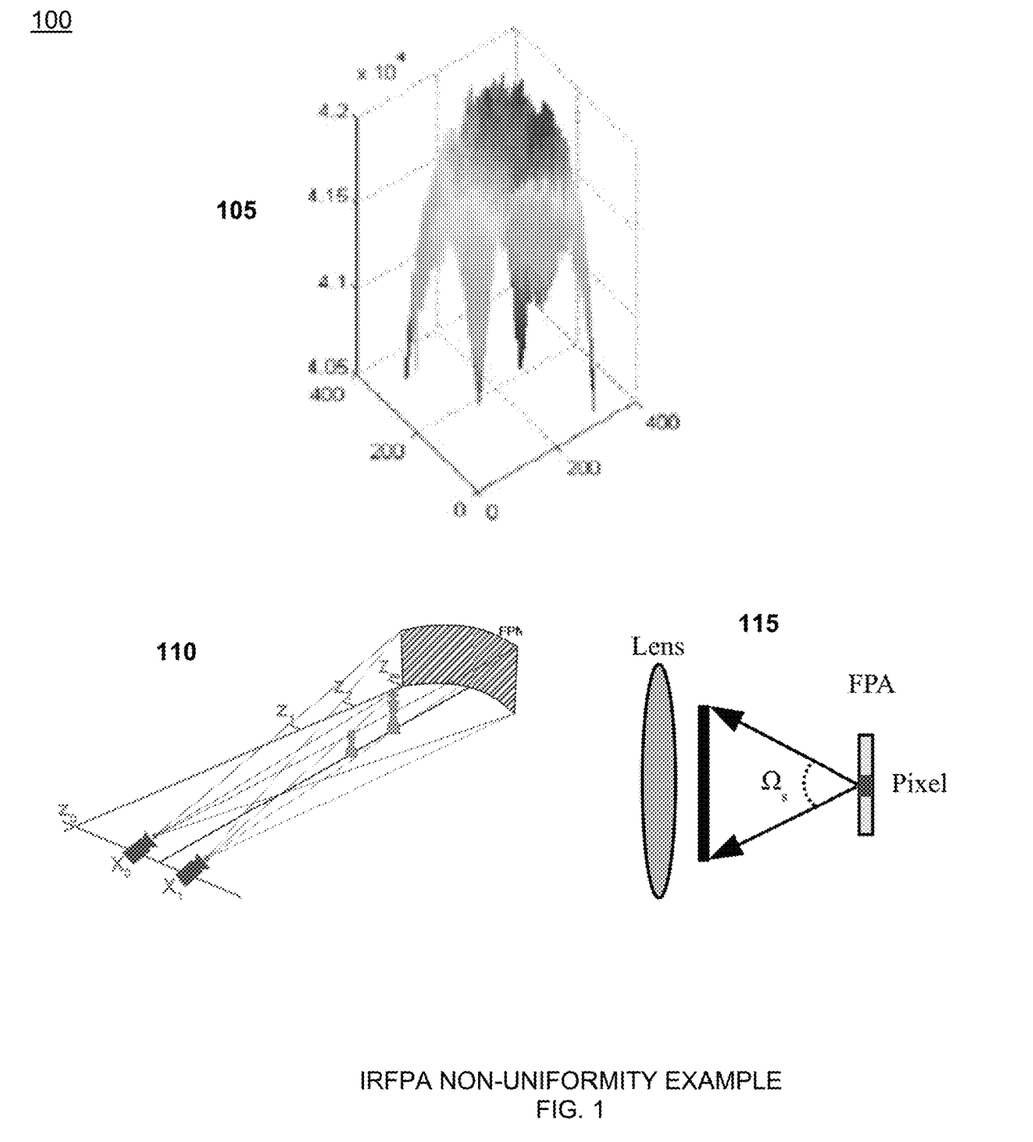
FIG. 1 depicts prior art non-uniformity correction (NUC) results.

FIG. 1 depicts infrared imager noise and current correction approaches 100. Included are a 3D plot 105 of an example of non-uniformity noise of an infrared focal plane array (IRFPA). Current approaches to correct for noise involve imager/scene motion 110 where movement changes the scene seen by the detector, and a blackbody source creating a known, constant, scene temperature 115.

What is needed is a device, system, and method to reduce pixel-based spatial noise in uncooled infrared imagers in situations with little or no movement, without creating burn-in while having a small resource footprint.

SUMMARY

An embodiment provides a method for reducing pixel-based spatial noise for an uncooled infrared imager comprising subtracting, for each selected pixel of an image frame, historical scene-based non-uniformity correction (NUC) offsets from a previous image frame; obtaining an edge-preserved, noise-smoothed, image frame; obtaining an edge-ignoring, high-pass, image frame; attenuating the edge-ignoring, high-pass, image frame; adding the attenuated edge-ignoring high-pass image frame to historical scene-based NUC offsets, thereby creating a new historical offset for the next frame; and outputting a new set of pixel values that represent the image frame. In embodiments an attenuating factor is varied based on scene contrast. In other embodiments, the method requires two rows of buffering pixels for the filter. In subsequent embodiments obtaining an edge-preserved, noise-smoothed image frame is from an edge-preserving mean filter that comprises a plus-shaped edge-preserving median filter and an edge-preserving mean. For additional embodiments, a low-pass version of a noise frame to be fed back into historical offsets is created with a 5×5 mean filter. Another embodiment further comprises subtracting a low-pass version of a noise frame created with a 5×5 mean filter from an initial noise frame, whereby scene rejection is improved. A following embodiment further comprises an edge preserving smoothing function consisting of a plus-shaped median kernel in which corresponding pixels with different intensity values are compared to intensity values of a center pixel of the plus-shaped median kernel by greater than a specified threshold are replaced with the center pixel, whereby pixel substitution increases a general edge preserving nature of the cross median filter, decreasing a likelihood of inappropriately suppressing useful information. In subsequent embodiments a threshold is programmed based on a signal-to-noise ratio (SNR) of a sensor, whereby edges above a noise floor are preserved, while noise is smoothed. Additional embodiments further comprise storing offsets in a double data rate (DDR) memory. Ensuing embodiments further comprise storing of the offsets is an 8 bit per pixel correction. Included embodiments further comprise using an 8 bit per pixel correction that is a S5.2 number, resulting in a maximum correction of +/−32 counts. In yet further embodiments, pixels of a scene motion are excluded from processing. In related embodiments, the imager includes no blackbody reference source. For further embodiments, the imager includes no blackbody reference source and scene motion is excluded from processing.

Another embodiment provides a device for reducing pixel-based spatial noise for an uncooled infrared imager comprising an infrared (IR) image sensor; and a computer program product including one or more non-transitory machine-readable mediums encoding instructions that when executed by one or more processors cause a process to be carried out comprising creating an edge-rejecting high-pass version of an incoming image comprising subtracting an edge-preserving mean filter from the incoming image; attenuating the subtracted incoming image by a factor; and adding the attenuated, subtracted, incoming image to a running historical sum; subtracting the historical sum from a next frame prior to a recursive calculation of a next set of offsets; generating the edge preserving mean of the edge-preserving mean filter by replacing any pixel in which an absolute value of a difference from a center pixel is greater than a threshold with the center pixel prior to calculation of the mean. For yet further embodiments, the method requires two rows of buffering for the filter. For more embodiments, the one or more processors comprises a field programmable gate array (FPGA). Continued embodiments include further comprising an 8 bit per pixel correction whereby storage of offsets fits into a limited memory bandwidth. For additional embodiments, the threshold is programmed based on a signal to noise ratio (SNR) of the sensor, whereby edges above a noise floor are preserved, while noise is smoothed.

A yet further embodiment provides a system for reducing pixel-based spatial noise for an uncooled infrared imager comprising an infrared (IR) image sensor; and a processor; in the processor creating an edge-rejecting high-pass version of an incoming image comprising subtracting an edge-preserving mean filter from the incoming image attenuating the subtracted incoming image by a factor; and adding the attenuated, subtracted, incoming image to a running historical sum; subtracting the historical sum from a next frame prior to a recursive calculation of a next set of offsets; generating the edge preserving mean of the edge-preserving mean filter by replacing any pixel in which an absolute value of a difference from a center pixel is greater than a threshold with the center pixel prior to calculation of the mean; wherein a low-pass version of a noise frame is created with a 5×5 mean filter; and wherein the edge-preserving mean filter comprises a plus-shaped edge-preserving mean filter.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

For embodiments, an edge-rejecting high-pass version of the image is created by subtracting a plus-shaped edge-preserving mean filter from the incoming image. This is then attenuated by a factor that can be varied based on scene contrast, and added to a running sum. This historical sum is then subtracted from the next frame prior to recursive calculation of the next set of offsets. The plus-shaped edge preserving mean is generated by replacing any pixel in which the absolute value of the difference from the center pixel is greater than a threshold with the center pixel prior to calculation of the mean. In embodiments, this light weight noise reduction (LWNR) is a minimal-resource method for field programmable gate arrays (FPGA) to reduce temporal and spatial noise in uncooled infrared systems. In other embodiments, this LWNR is a minimal-resource method for application-specific integrated circuits (ASICs) to reduce temporal and spatial noise in uncooled infrared systems. In addition to the frame-edge-preserving smoothing function, embodiments include a historical scene based NUC function to reduce high frequency spatial noise. Other potential uses include correcting other types of dynamic, but bounded, non-uniformity.

Figure 2:
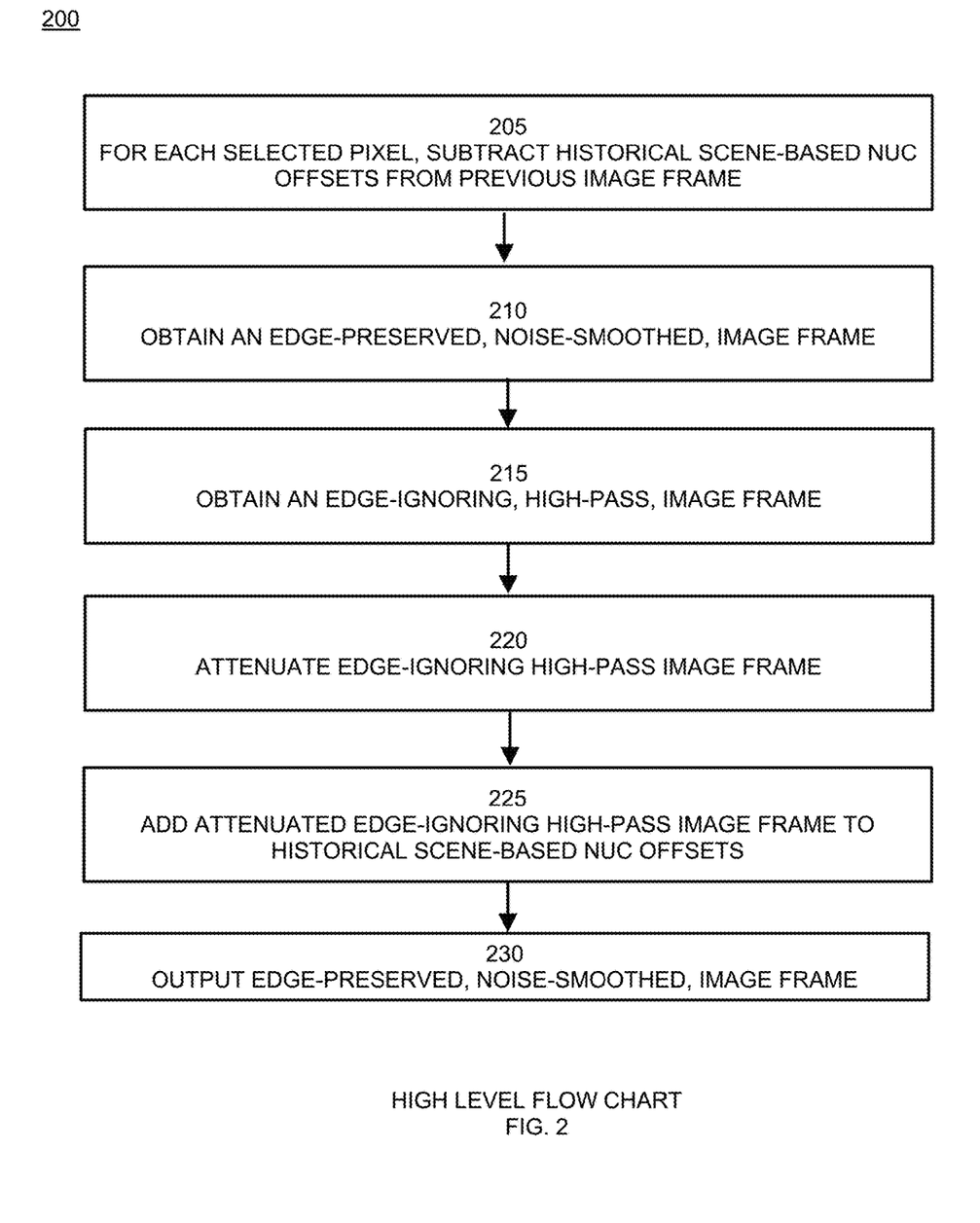
FIG. 2 depicts a high level flow chart for a method configured in accordance with an embodiment.

FIG. 2 is a high level flow chart 200 of a first embodiment method for reducing pixel-based spatial noise for an uncooled infrared imager. Process comprises: for each selected pixel, subtracting historical scene-based NUC offsets from previous image frame 205 (where NUC offsets for the first frame are initialized by setting to zero); obtaining an edge-preserved, noise-smoothed, image frame 210; obtaining an edge-ignoring, high-pass, image frame 215; attenuating edge-ignoring high-pass image frame 220; adding attenuated edge-ignoring high-pass image frame to historical scene-based NUC offsets 225; and outputting edge-preserved, noise-smoothed, image frame 230. In embodiments, certain pixels in a frame are left out, such as focusing on a small region in the frame. In some embodiments, the level of attenuation of step 220 is a fixed value. In an embodiment, the attenuation is fixed at −0.1. In other embodiments, the level of attenuation is adjusted based on measured levels of noise or scene content.

Figure 3:
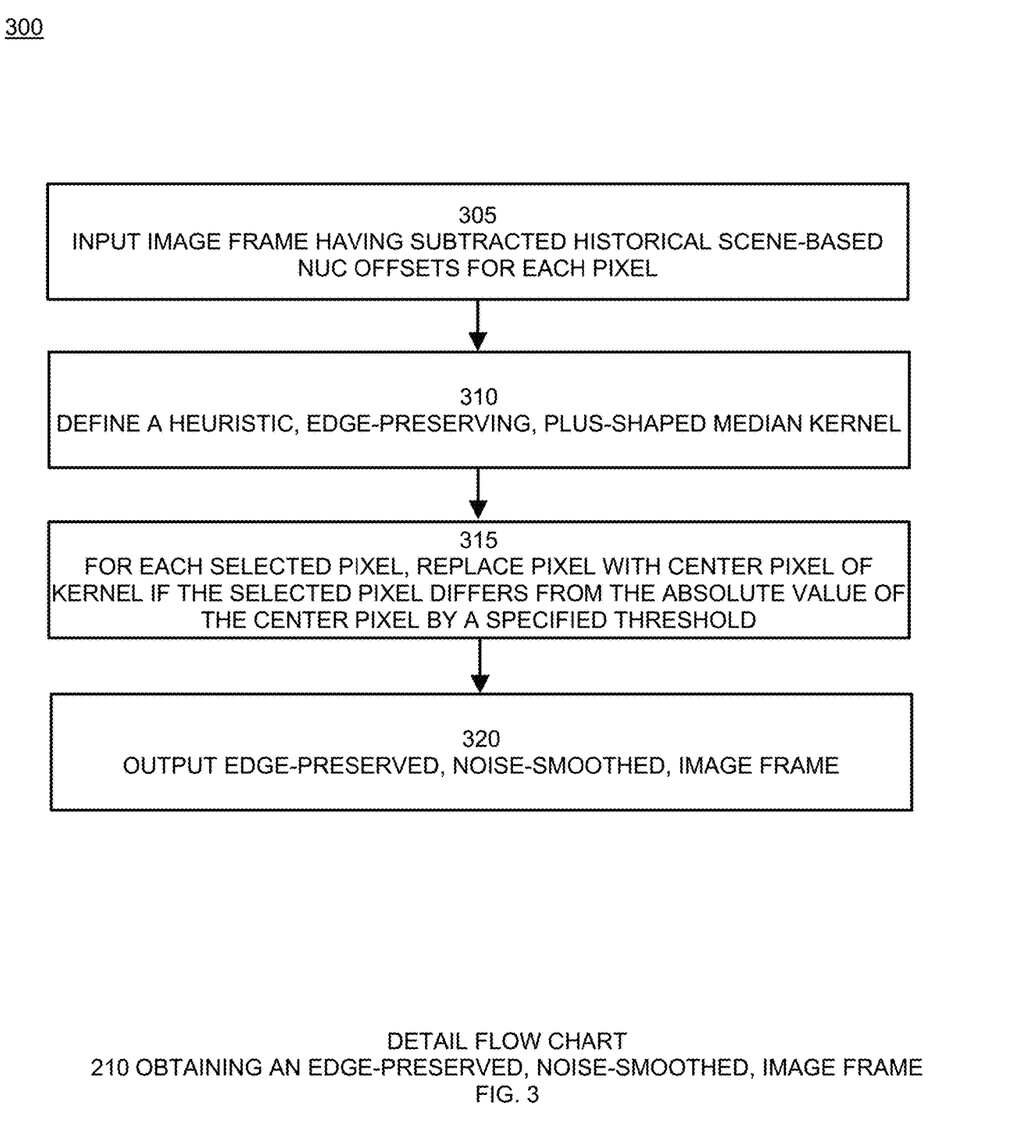
FIG. 3 is a detail flow chart for a method configured in accordance with an embodiment.

FIG. 3 is a detail flow chart 300 for step 210, obtaining an edge-preserved, noise-smoothed, image frame. This comprises: inputting an image frame having subtracted historical scene-based NUC offsets (from the previous frame's results) for each pixel 305; defining a heuristic, edge-preserving, plus-shaped median kernel 310; for each selected pixel, replace the intensity value of the selected pixel with the intensity value of the center pixel of a shaped median kernel, such as plus-shaped around the selected pixel, and if the pixel intensity value differs from the absolute value of the center pixel by a specified (based on the desired minimum resolvable target) threshold 315; outputting the edge-preserved, noise-smoothed, image frame 320. In embodiments, the plus-shaped median kernel is defined as the pixels directly adjacent (not diagonal) to the center or selected pixel for every pixel of the processed area of an image. For embodiments, the threshold is determined by the desired minimum resolvable target.

Figure 4:
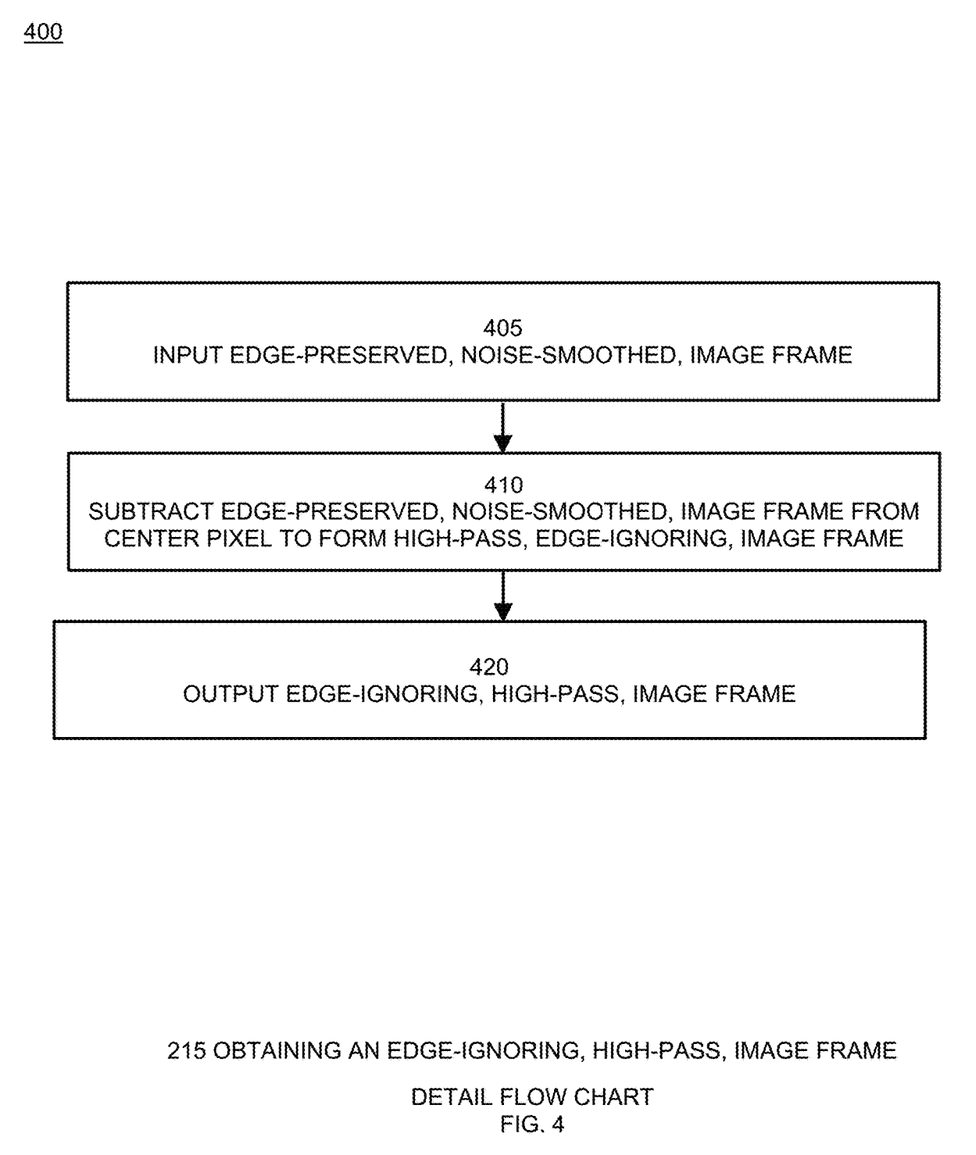
FIG. 4 is a detail flow chart for a method configured in accordance with an embodiment.

FIG. 4 is a detail flow chart 400 for step 215, obtaining an edge-ignoring, high-pass, image frame. This comprises: inputting an edge-preserved, noise-smoothed, image frame 405; subtracting the edge-preserved, noise-smoothed, image frame from the center pixel to form a high-pass, edge-ignoring, image frame 410; and outputting the edge-ignoring, high-pass, image frame 420.

Figure 5:
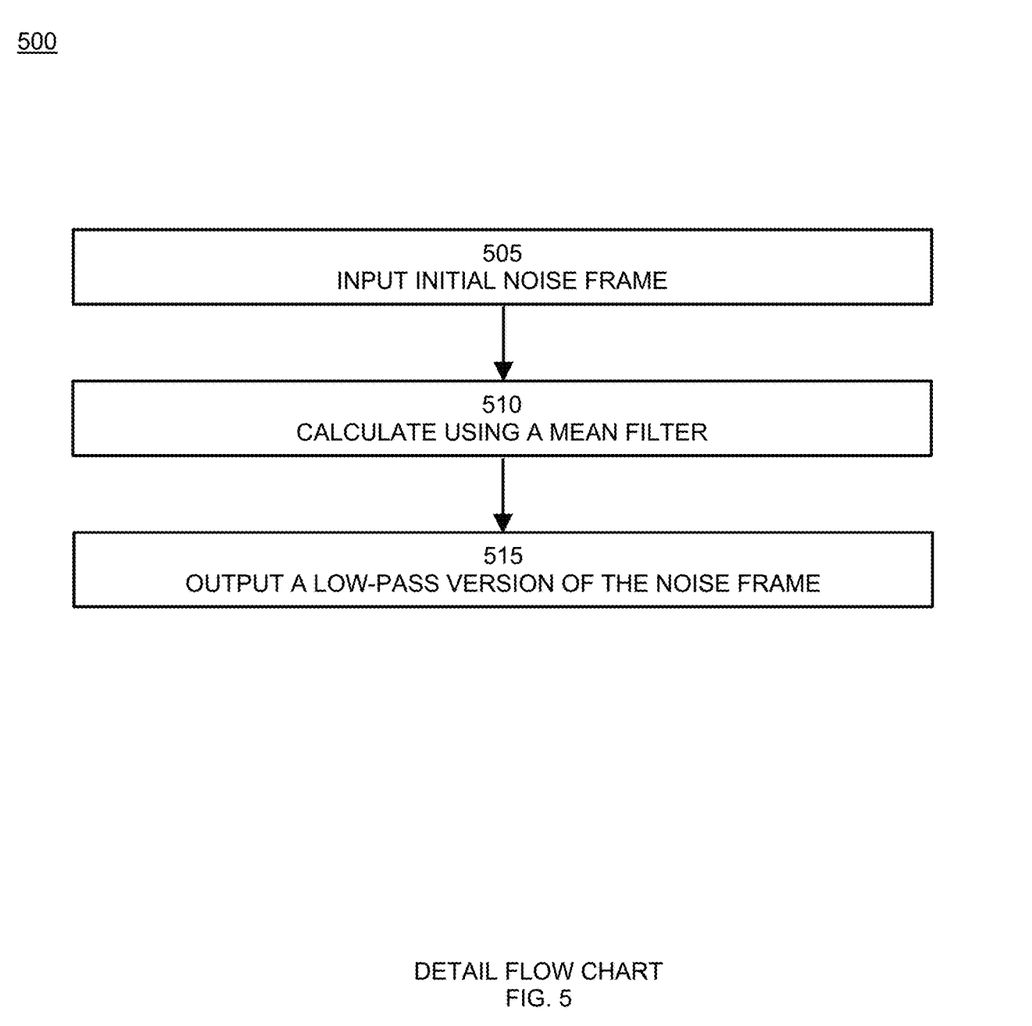
FIG. 5 is a flow chart for a method configured in accordance with another embodiment.

FIG. 5 is a detail flow chart 500 to produce a version of the noise frame to be fed back into the historical offsets. Steps comprise: inputting an initial noise frame 505; calculating, by subtracting a mean filter low pass (such as a 5×5 filter) from the noise frame 510; and outputting a low-pass version of the noise frame 515. The low pass is subtracted from the noise frame, and the result is fed back into the historical offsets. In embodiments, the mean filter (ex. 5×5) must be larger than the plus shaped (ex. 3×3) median.

Figure 6:
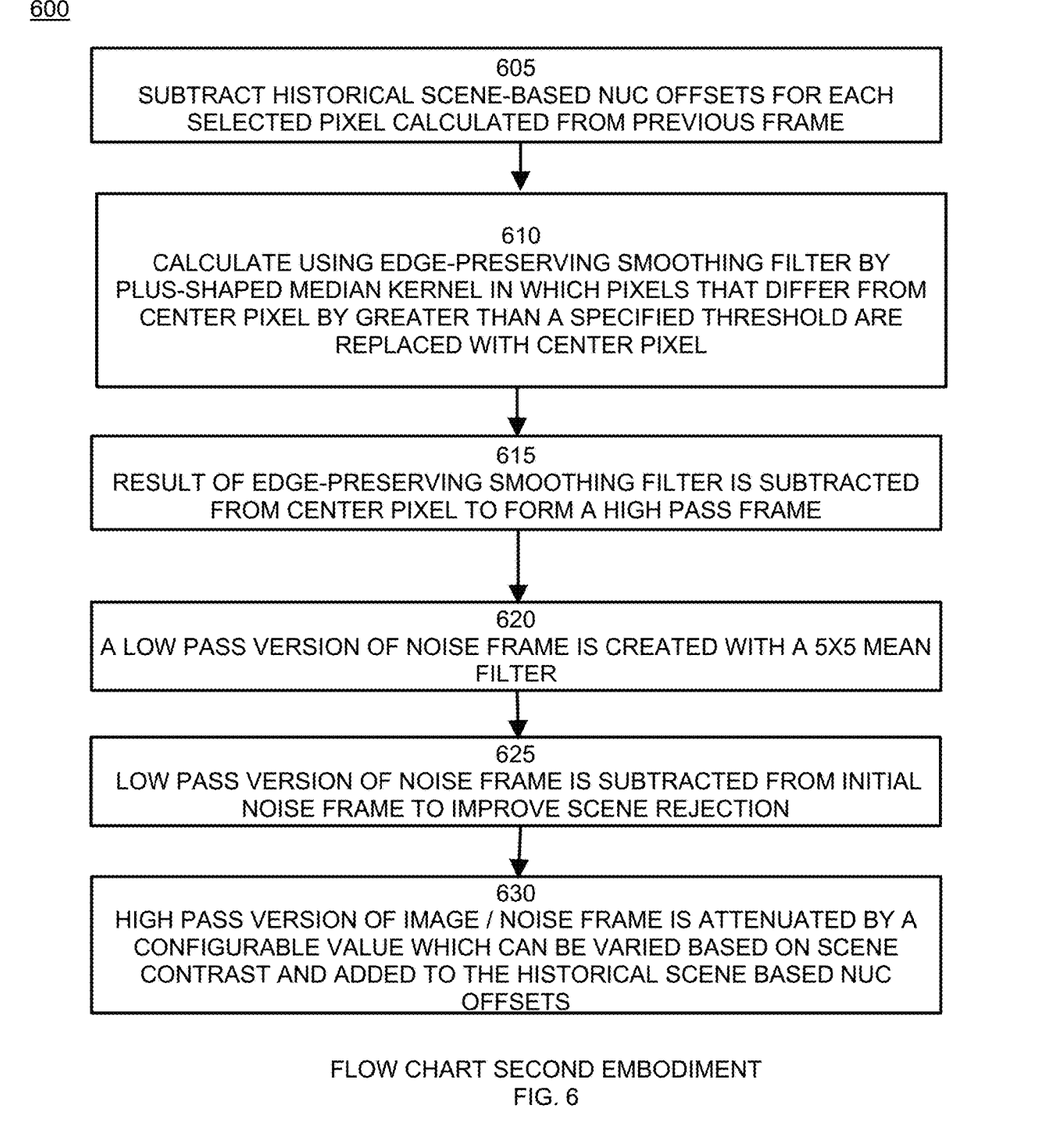
FIG. 6 depicts a flow chart for a method configured in accordance with an embodiment.

FIG. 6 is a detail flow chart 600 of an embodiment method for reducing pixel-based spatial noise for an uncooled infrared imager. Steps comprise subtracting the historical scene-based NUC offsets for each selected pixel calculated from the previous frame 605; calculating a filtered image using an edge-preserving smoothing filter where embodiments of the edge-preserving smoothing function consist of a plus-shaped median kernel in which pixels that differ from the center pixel by greater than a specified threshold are replaced with the center pixel 610. This pixel substitution increases the general edge-preserving nature of the cross median filter, decreasing the likelihood of inappropriately suppressing useful information. The result of this filter is then subtracted from the center pixel to form a high-pass, edge-ignoring, version of the frame which is dominated by system noise 615. A low-pass version of the noise frame is created with a 5×5 mean filter 620 (where the 5×5 region is averaged around each pixel). This is then subtracted from the initial noise frame to improve scene rejection 625. This high pass version of the image/noise frame is attenuated by a configurable value (which can optionally be varied based on scene contrast) and added to the historical scene based NUC offsets 630.

Figure 7:
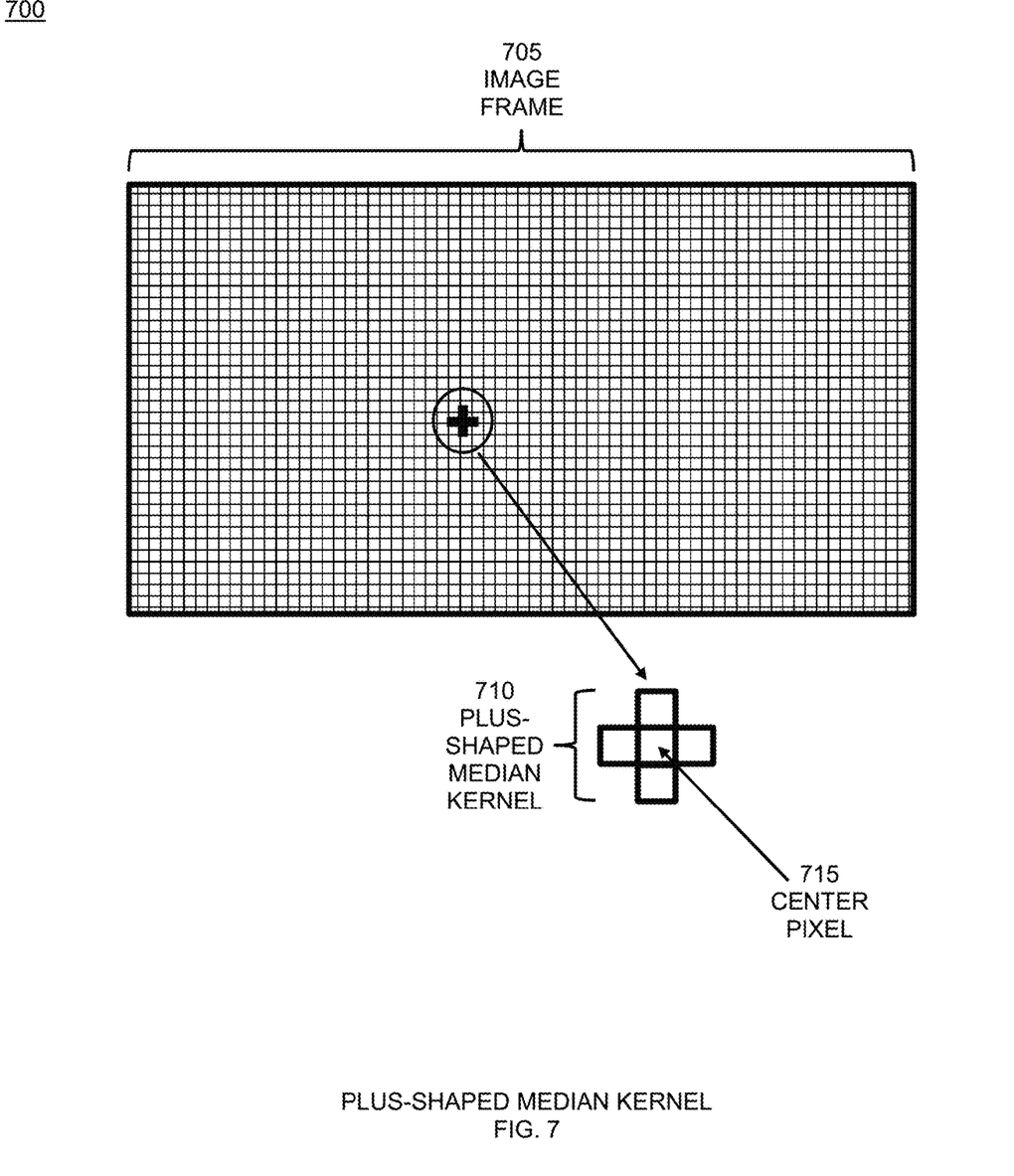
FIG. 7 depicts an image frame plus-shaped median kernel configured in accordance with an embodiment.

FIG. 7 depicts a median kernel for an image frame 700. Image frame 705 is processed by a heuristic, edge-preserving, plus-shaped median kernel 710. Within plus-shaped median kernel 710 is center pixel 715. Embodiments use both a 3×3 plus-shaped median kernel and a 5×5 mean filter at different times. The noise is separated with the plus shaped 3×3 median kernel, and the 5×5 mean filter is run on the high pass results.

Figure 8:
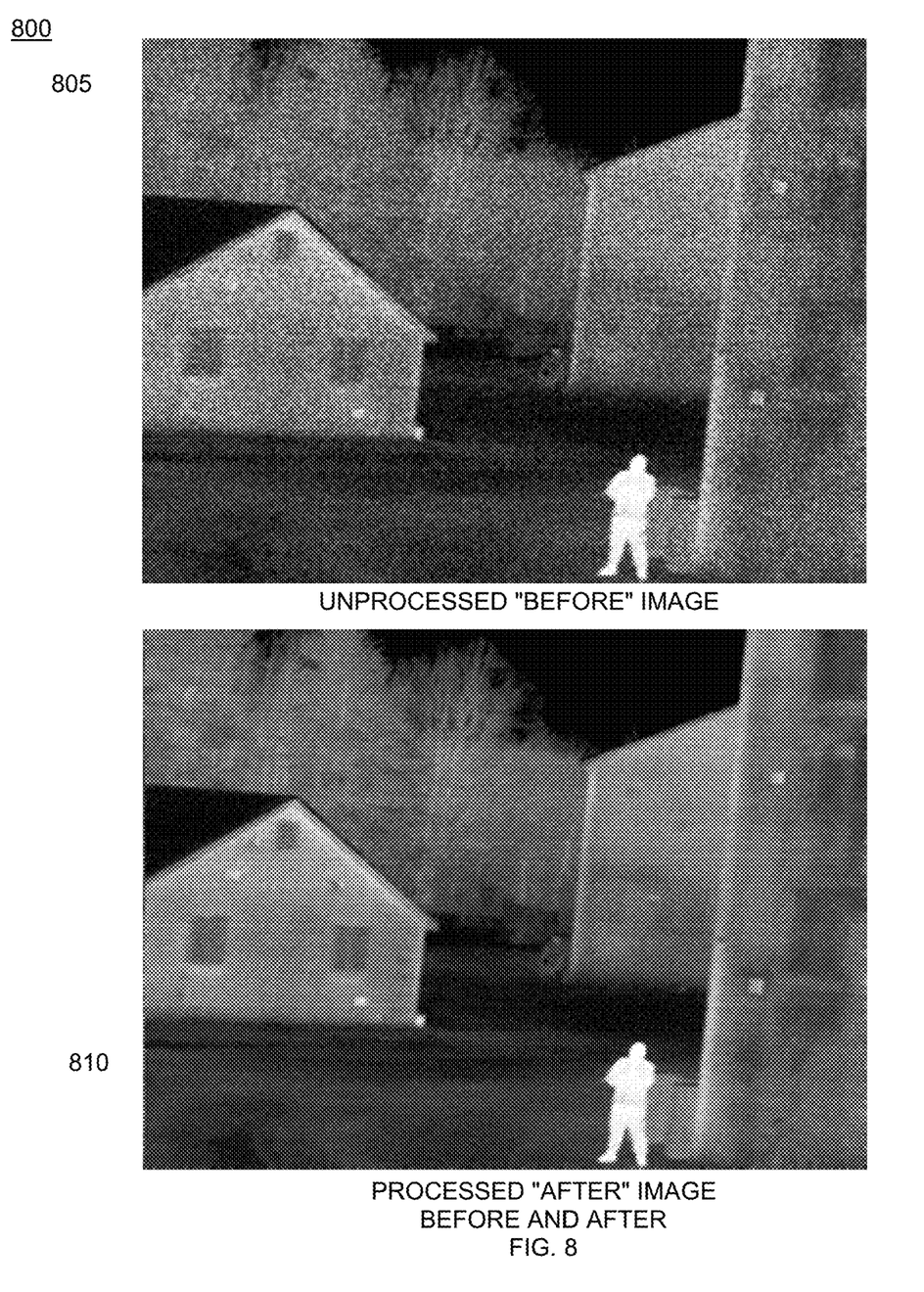
FIG. 8 depicts before and after suppression display results configured in accordance with an embodiment.

FIG. 8 images 800 depicts before 805 and after 810 suppression display results for an embodiment. Visible is the very high pixel spatial noise in the unprocessed "before" image 805.

Summarizing, the method is based on a heuristic edge-preserving mean kernel. A plus-shaped median kernel is used to smooth the image. In order to preserve edges, the absolute value of the center pixel minus each individual pixel is compared against a programmable threshold. If the difference exceeds that threshold, the pixel is replaced with the center pixel. The threshold is programmed based on the SNR of the sensor. The result is that edges above the noise floor are preserved, while noise is smoothed. The result of this filter is then subtracted from the center pixel to form a high pass, edge ignoring, version of the frame which is dominated by system noise. This high pass version of the image is attenuated by a configurable value which can be varied based on scene contrast, and added to the historical scene-based NUC offsets.

In embodiments, the first step is to subtract the historical scene-based NUC offsets for each pixel calculated from the previous frame. A filtered image for output module output is then calculated using an edge preserving smoothing filter. As mentioned, embodiments of the edge preserving smoothing function consist of a plus-shaped median kernel in which pixels that differ from the center pixel by greater than a specified threshold are replaced with the center pixel. This pixel substitution increases the general edge preserving nature of the cross median filter, decreasing the likelihood of inappropriately suppressing useful information. The result of this filter is then subtracted from the center pixel to form a high pass, edge ignoring, version of the frame which is dominated by system noise. A low pass version of the noise frame is created with a 5×5 mean filter. This is then subtracted from the initial noise frame to improve scene rejection. This high pass version of the image/noise frame is attenuated by a configurable value which can be varied based on scene contrast and added to the historical scene based NUC offsets.

In embodiments, applying the algorithm requires two rows of buffering for the filter. For embodiments, the scene based NUC portion of the algorithm can be quite memory intensive due to the read modify write nature of the algorithm. In embodiments, the size of the frame may necessitate the use of the double data rate (DDR) memory for storage of the offsets. For embodiments, in order to fit this into the limited memory bandwidth available, an 8 bit per pixel correction is used. In embodiments, this is a S5.2 number resulting in a maximum correction of +/−32 counts.

The following first, SBNUC, MATLAB listing provides operations for method steps for embodiments.

```
[ imIn, nucMap, highPass ] = lwnrSbnuc( imIn, nucMap, thresh,
weight )
%LWNRSBNUC Summary
%   Detail
width = size(imIn, 2);
height = size(imIn, 1);
highPass = zeros(height, width);
%correct image
imIn = imIn − nucMap;
% calculate edge preserving high pass of image
for y=2: (height−1)
    for x=2: (width−1)
        count = 0;
        avg = 0;
        for y2=(y − 1) : (y + 1)
            for x2=(x − 1) : (x + 1)
                if abs(imIn(y,x) − imIn(y2,x2)) < thresh
                    avg =avg + imIn(y2,x2);
                    count = count + 1;
                end
            end
        end
        % subtract edge preserved blur from image in
        highPass(y,x) = imIn(y,x) − (avg / count);
    end
end
%feed high pass into nuc map
nucMap = nucMap + (highPass * weight);
end
```

The following second, LWNR, MATLAB listing provides operations for method steps for embodiments.

```
function [ imOut, nucMap, highPass ] = lwnrSbnuc( imIn,
nucMap, thresh, weight )
%LWNRSBNUC Performs scene based non-uniformity correction
utilizing a plus
%shaped median filter with heuristic pixel substitution.
%   imIn = input image
%   nucMap = the calculated nuc map from the previous frame.
must be
%           initialized to zeros the same size as imIn
%   thresh = the substitution threshold for median filter
%   weight = attenuation for feedback. 0-1
width = size(imIn, 2);
height = size(imIn, 1);
lowPass = imIn;
% variables to simulate fixed point of s5.2
cap = 128;
fractional = 4;
%correct image using the previous nuc map
imIn = imIn − round(nucMap / fractional);
%detect first frame
if(sum(sum(nucMap ~= 0)) == 0)
    weight = 1;
end
%perform LWNR-X filter
for y=2: (height−1)
    for x=2: (width−1)
        plus = [imIn(y−1, x), imIn(y+1, x), imIn(y, x),
imIn(y, x−1) ,imIn(y, x+1)];
        plus(abs(plus − imIn(y, x)) > thresh) = imIn(y, x);
        lowPass(y,x) = median(plus);
    end
end
%subtract low pass from image to generate high pass
highPass = imIn − lowPass;
%output low pass as processed image
imOut = lowPass;
%use a 5×5 mean filter to high pass the high pass
filterKernel = ones(5)/25;
highPass = highPass − filter2(filterKernel, highPass);
%feed high pass into nuc map. Scale by fixed point fractional
bits
nucMap = nucMap + (highPass * fractional * weight);
%bound the nuc map to fixed point range
nucMap = round(nucMap);
nucMap(nucMap > cap) = cap;
nucMap(nucMap < −cap) = −cap;
end
```

TABLE 1

NUMERICAL IMPACT OF LWNR-CS PROCESSING

| | Raw Data (counts) | Processed (counts) | Change |
|---|---|---|---|
| σTVH | 3.97 | 4.10 | 3.2% |
| σVH | 11.72 | 1.09 | −90.7% |
| σV | 1.05 | 0.31 | −70.4% |
| σH | 0.93 | 0.21 | −77.4% |

In TABLE 1, the noise component TVH is the random temporal noise, components V, H, and VH are the random fixed-pattern noise. More specifically, σTVH is Random Spatio-Temporal Noise from Detector Temporal Noise. σVH is Random Spatial Noise, Bi-Directional Fixed Pattern Noise from Pixel Processing, Detector-to-Detector Non-Uniformity, 1/f. σV is Fixed Row Noise, Line-to-Line Non-Uniformity from Detector-to-Detector Non-Uniformity. σH is Fixed Column Noise, Column-to-Column Non-Uniformity from Scan Effects, Detector-to-Detector Non-Uniformity.

As seen in Table 1, σTVH has gone from 3.97 raw data counts to 4.10 processed counts, a 3.2% change. σVH has gone from 11.72 raw data counts to 1.09 processed counts, a −90.7% change. σV has gone from 1.05 raw data counts to 0.31 processed counts, a −70.4% change. σH has gone from 0.93 raw data counts to 0.21 processed counts, a −77.4% change.

The computing system used for the reduction of pixel-based spatial noise in uncooled infrared imagers for performing (or controlling) the operations or functions described hereinabove with respect to the system and/or the method may include a processor, FPGA, I/O devices, a memory system, and a network adaptor. The computing system includes a program module (not shown) for performing (or controlling) the operations or functions described hereinabove with respect to the system and/or the method according to exemplary embodiments. For example, the program module may include routines, programs, objects, components, logic, data structures, or the like, for performing particular tasks or implement particular abstract data types. The processor may execute instructions written in the program module to perform (or control) the operations or functions described hereinabove with respect to the system and/or the method. The program module may be programmed into the integrated circuits of the processor. In an exemplary embodiment, the program module may be stored in the memory system or in a remote computer system storage media.

The computing system may include a variety of computing system readable media. Such media may be any available media that is accessible by the computer system, and it may include both volatile and non-volatile media, removable and non-removable media.

The memory system can include computer system readable media in the form of volatile memory, such as random access memory (RAM) and/or cache memory or others. The computer system may further include other removable/non-removable, volatile/non-volatile computer system storage media. The computer system can communicate with one or more devices using the network adapter. The network adapter may support wired communications based on Internet, LAN, WAN, or the like, or wireless communications based on CDMA, GSM, wideband CDMA, CDMA-2000, TDMA, LTE, wireless LAN, Bluetooth, or the like.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to a flowchart illustration and/or block diagram of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of the embodiments has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A method for reducing pixel-based spatial noise for an uncooled infrared imager comprising:
    subtracting, for each selected pixel of an image frame, historical scene-based non-uniformity correction (NUC) offsets from a previous image frame;
    obtaining an edge-preserved, noise-smoothed, image frame;
    obtaining an edge-ignoring, high-pass, image frame;
    attenuating said edge-ignoring, high-pass, image frame;
    adding said attenuated edge-ignoring high-pass image frame to historical scene-based NUC offsets, thereby creating a new historical offset for the next frame; and
    outputting a new set of pixel values that represent the image frame.

2. The method of claim 1, wherein an attenuating factor is varied based on scene contrast.

3. The method of claim 1, wherein said method requires two rows of buffering pixels for said filter.

4. The method of claim 1, wherein obtaining an edge-preserved, noise-smoothed image frame is from an edge-preserving mean filter that comprises a plus-shaped edge-preserving median filter and an edge-preserving mean.

5. The method of claim 1, wherein a low-pass version of a noise frame to be fed back into historical offsets is created with a 5×5 mean filter.

6. The method of claim 1, further comprising subtracting a low-pass version of a noise frame created with a 5×5 mean filter from an initial noise frame, whereby scene rejection is improved.

7. The method of claim 1, further comprising:
    an edge preserving smoothing function consisting of a plus-shaped median kernel in which corresponding pixels with different intensity values are compared to intensity values of a center pixel of said plus-shaped median kernel by greater than a specified threshold are replaced with said center pixel, whereby pixel substitution increases a general edge preserving nature of said cross median filter, decreasing a likelihood of inappropriately suppressing useful information.

8. The method of claim 1, wherein a threshold is programmed based on a signal-to-noise ratio (SNR) of a sensor, whereby edges above a noise floor are preserved, while noise is smoothed.

9. The method of claim 1, further comprising:
storing offsets in a double data rate (DDR) memory.

10. The method of claim 1, further comprising storing of the offsets is an 8 bit per pixel correction.

11. The method of claim 1, further comprising using an 8 bit per pixel correction that is a S5.2 number, resulting in a maximum correction of +/−32 counts.

12. The method of claim 1, wherein pixels of a scene motion are excluded from processing.

13. The method of claim 1, wherein said imager includes no blackbody reference source.

14. The method of claim 1, wherein said imager includes no blackbody reference source and scene motion is excluded from processing.

15. A device for reducing pixel-based spatial noise for an uncooled infrared imager comprising:
an infrared (IR) image sensor; and
a computer program product including one or more non-transitory machine-readable mediums encoding instructions that when executed by one or more processors cause a process to be carried out comprising:
creating an edge-rejecting high-pass version of an incoming image comprising:
subtracting an edge-preserving mean filter from said incoming image;
attenuating said subtracted incoming image by a factor; and
adding said attenuated, subtracted, incoming image to a running historical sum;
subtracting said historical sum from a next frame prior to a recursive calculation of a next set of offsets;
generating said edge preserving mean of said edge-preserving mean filter by replacing any pixel in which an absolute value of a difference from a center pixel is greater than a threshold with said center pixel prior to calculation of said mean.

16. The device of claim 15, wherein said method requires two rows of buffering for said filter.

17. The device of claim 15, wherein said one or more processors comprises a field programmable gate array (FPGA).

18. The device of claim 15, further comprising:
an 8 bit per pixel correction whereby storage of offsets fits into a limited memory bandwidth.

19. The device of claim 15, wherein said threshold is programmed based on a signal to noise ratio (SNR) of said sensor, whereby edges above a noise floor are preserved, while noise is smoothed.

20. A system for reducing pixel-based spatial noise for an uncooled infrared imager comprising:
an infrared (IR) image sensor; and
a processor;
in said processor:
creating an edge-rejecting high-pass version of an incoming image comprising:
subtracting an edge-preserving mean filter from said incoming image;
attenuating said subtracted incoming image by a factor; and
adding said attenuated, subtracted, incoming image to a running historical sum;
subtracting said historical sum from a next frame prior to a recursive calculation of a next set of offsets;
generating said edge preserving mean of said edge-preserving mean filter by replacing any pixel in which an absolute value of a difference from a center pixel is greater than a threshold with said center pixel prior to calculation of said mean;
wherein a low-pass version of a noise frame is created with a 5×5 mean filter; and
wherein said edge-preserving mean filter comprises a plus-shaped edge-preserving mean filter.

* * * * *